US012653210B2

(12) United States Patent
Ahlvers et al.

(10) Patent No.: US 12,653,210 B2
(45) Date of Patent: Jun. 16, 2026

(54) AUTOMATED METHOD FOR PROCESSING A VISCERA STREAM WITH A COOLING FLUID

(71) Applicant: Incuvator Fund I, LLC, Sabetha, KS (US)

(72) Inventors: Cole M. Ahlvers, Topeka, KS (US); Charles Parker, Kansas City, MO (US); John C. Kuenzi, Sabetha, KS (US)

(73) Assignee: Icuvator Fund I, LLC, Sabetha, KS (US)

( * ) Notice: Subject to any disclaimer, the term of this patent is extended or adjusted under 35 U.S.C. 154(b) by 448 days.

(21) Appl. No.: 18/334,673

(22) Filed: Jun. 14, 2023

(65) Prior Publication Data

US 2023/0320379 A1      Oct. 12, 2023

Related U.S. Application Data

(62) Division of application No. 16/562,428, filed on Sep. 5, 2019, now Pat. No. 11,793,215.

(60) Provisional application No. 62/728,148, filed on Sep. 7, 2018.

(51) Int. Cl.
| | |
|---|---|
| *A23K 10/20* | (2016.01) |
| *A22C 21/06* | (2006.01) |
| *A23K 20/163* | (2016.01) |
| *A23K 20/174* | (2016.01) |
| *C12H 1/18* | (2006.01) |

(52) U.S. Cl.
CPC .............. *A23K 10/20* (2016.05); *A22C 21/06* (2013.01); *A23K 20/163* (2016.05); *A23K 20/174* (2016.05); *C12H 1/18* (2013.01)

(58) Field of Classification Search
CPC .... A23K 10/20; A23K 20/163; A23K 20/174; A22C 21/06; C12H 1/18
USPC ....................................................... 426/646
See application file for complete search history.

(56) References Cited

U.S. PATENT DOCUMENTS

| | | | |
|---|---|---|---|
| 3,393,413 A * | 7/1968 | Walter | A22C 17/08 451/328 |
| 6,514,551 B1 | 2/2003 | Schur | |
| 7,205,016 B2 | 4/2007 | Garwood | |
| 7,575,771 B2 | 8/2009 | Ciantar et al. | |
| 7,763,717 B1 | 7/2010 | Jaczynski | |
| 7,842,329 B2 | 11/2010 | Saylock et al. | |
| 8,668,948 B2 | 3/2014 | Juravic et al. | |
| 10,130,112 B2 | 11/2018 | Darling et al. | |
| 2004/0185155 A1 | 9/2004 | Garwood | |
| 2004/0265470 A1 | 12/2004 | Ciantar et al. | |
| 2007/0221552 A1 | 9/2007 | Denney | |
| 2014/0087432 A1* | 3/2014 | Nguyen | D21C 7/10 165/104.11 |
| 2014/0234486 A1 | 8/2014 | De Ratuld | |
| 2014/0314933 A1 | 10/2014 | Schlebusch | |
| 2017/0311627 A1 | 11/2017 | Blanville-Onno et al. | |

OTHER PUBLICATIONS

FP Food Processing, Process System Provides Rapid Production of Chicken Viscera, Web Publication, Oct. 12, 2015, 4 pages, https://www.fponthenet.net/article/105957/Process-system-provides-rapid-production-of-chicken-viscera.aspx, Tonbridge England.

* cited by examiner

*Primary Examiner* — Erik Kashnikow
*Assistant Examiner* — Bhaskar Mukhopadhyay
(74) *Attorney, Agent, or Firm* — Coughlin Law Office; Stuart M. Aller; Daniel J. Coughlin

(57)      ABSTRACT

An automated method for processing a variable flow of an incoming viscera stream from a carcass processing facility. A cooling fluid is used to convey and cool the incoming viscera stream from an eviscerating site to an attached modular facility. The viscera stream is directed by the cooling fluid towards a divert valve and diverted between modular facilities based on a comparison of the flow rate of the incoming viscera stream with the processing capacity of the modular facility. The divert valve can divert the viscera stream to finished feed processing equipment when flow rates exceed a minimum flow rate. Flow rates below the minimum flow rate are directed to an ingredient stream. A cooked product of the viscera stream can be cooled using wastewater from the cooling fluid. The cooled product can be stored without refrigeration at the modular facility.

20 Claims, 6 Drawing Sheets

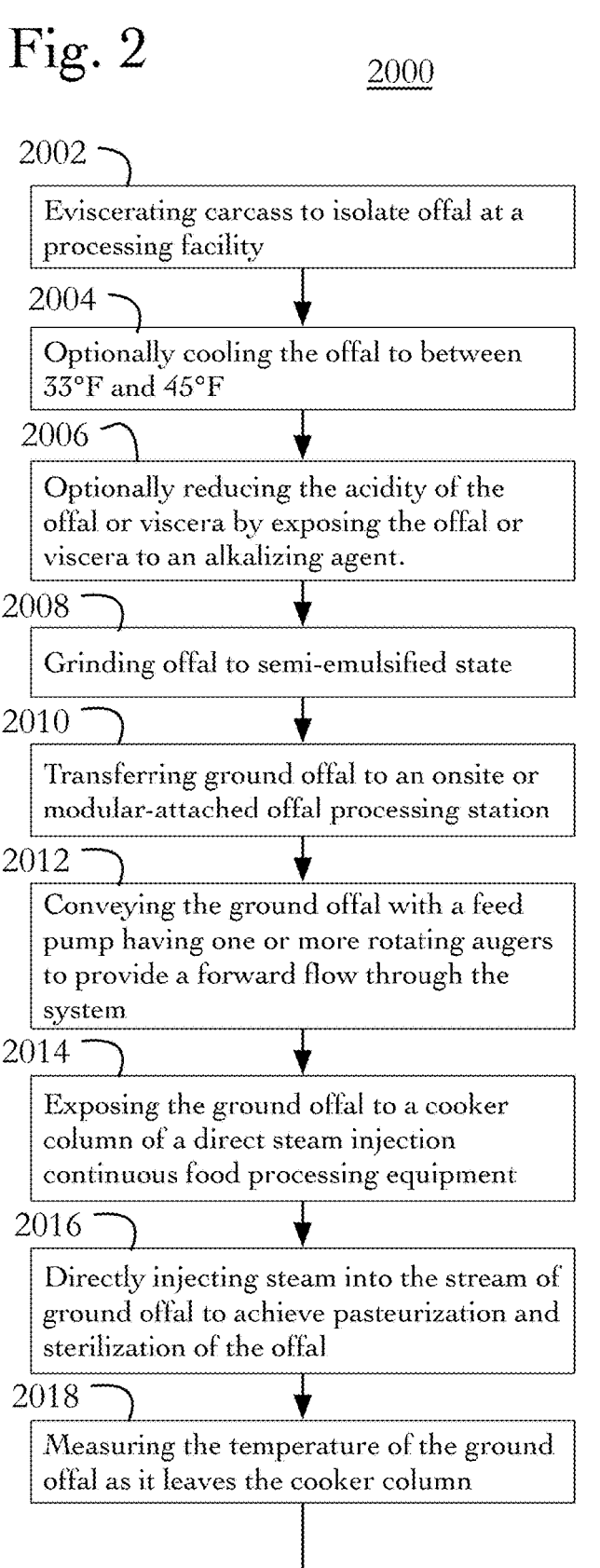

2002
Eviscerating carcass to isolate offal at a processing facility

2004
Optionally cooling the offal to between 33°F and 45°F

2006
Optionally reducing the acidity of the offal or viscera by exposing the offal or viscera to an alkalizing agent.

2008
Grinding offal to semi-emulsified state

2010
Transferring ground offal to an onsite or modular-attached offal processing station 2012
Conveying the ground offal with a feed pump having one or more rotating augers to provide a forward flow through the system 2014
Exposing the ground offal to a cooker column of a direct steam injection continuous food processing equipment 2016
Directly injecting steam into the stream of ground offal to achieve pasteurization and sterilization of the offal 2018
Measuring the temperature of the ground offal as it leaves the cooker column

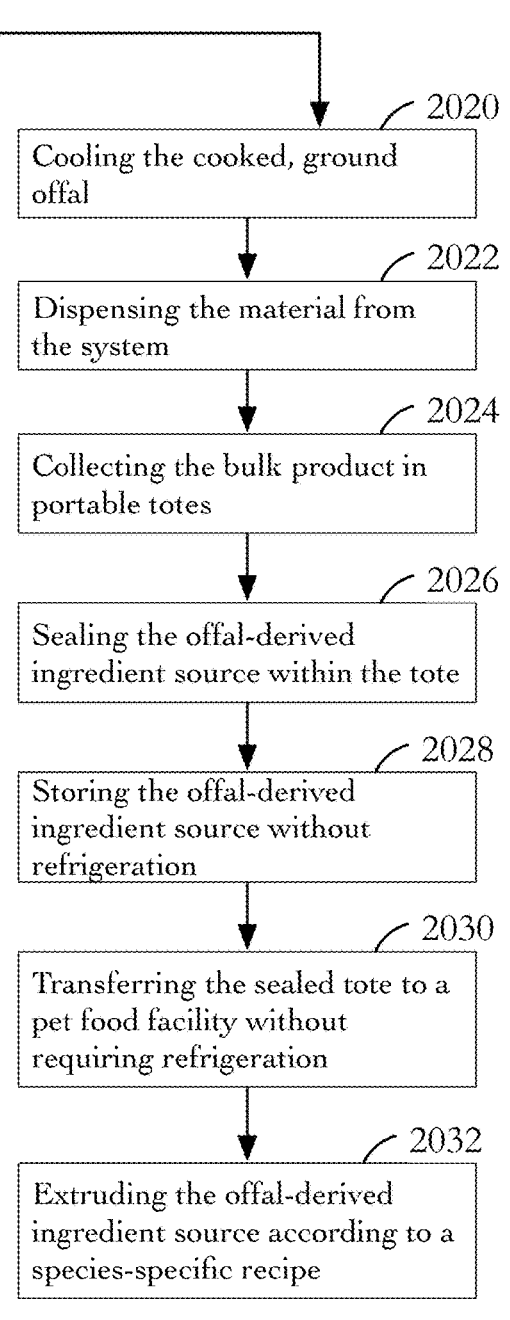

2020
Cooling the cooked, ground offal

2022
Dispensing the material from the system

2024
Collecting the bulk product in portable totes

2026
Sealing the offal-derived ingredient source within the tote

2028
Storing the offal-derived ingredient source without refrigeration

2030
Transferring the sealed tote to a pet food facility without requiring refrigeration 2032
Extruding the offal-derived ingredient source according to a species-specific recipe

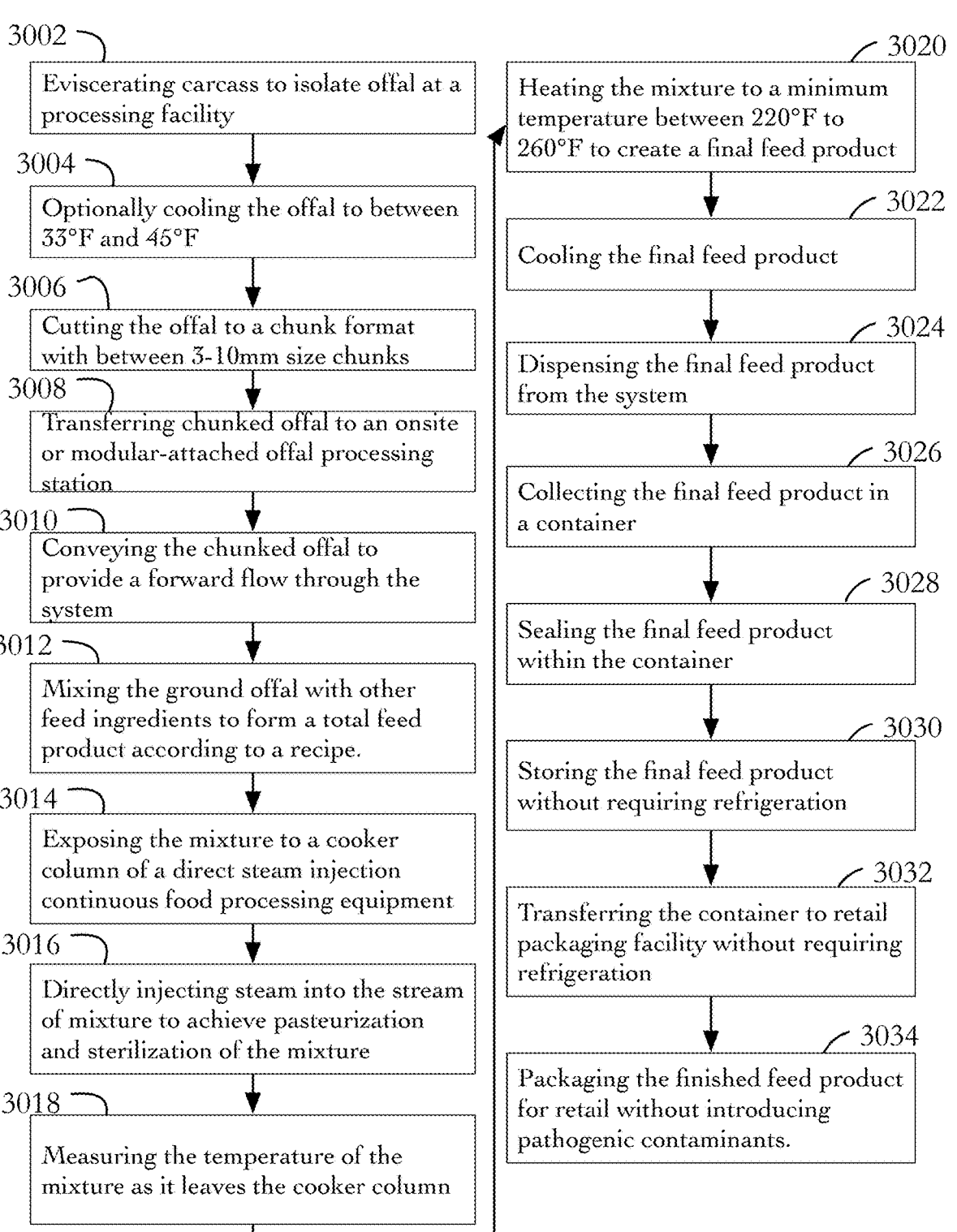

3002
Eviscerating carcass to isolate offal at a processing facility

3004
Optionally cooling the offal to between 33°F and 45°F

3006
Cutting the offal to a chunk format with between 3-10mm size chunks

3008
Transferring chunked offal to an onsite or modular-attached offal processing station 3010
Conveying the chunked offal to provide a forward flow through the system 3012
Mixing the ground offal with other feed ingredients to form a total feed product according to a recipe.

3014
Exposing the mixture to a cooker column of a direct steam injection continuous food processing equipment 3016
Directly injecting steam into the stream of mixture to achieve pasteurization and sterilization of the mixture 3018
Measuring the temperature of the mixture as it leaves the cooker column 3020
Heating the mixture to a minimum temperature between 220°F to 260°F to create a final feed product 3022
Cooling the final feed product 3024
Dispensing the final feed product from the system 3026
Collecting the final feed product in a container 3028
Sealing the final feed product within the container 3030
Storing the final feed product without requiring refrigeration 3032
Transferring the container to retail packaging facility without requiring refrigeration 3034
Packaging the finished feed product for retail without introducing pathogenic contaminants.

Fig. 4                                          4000

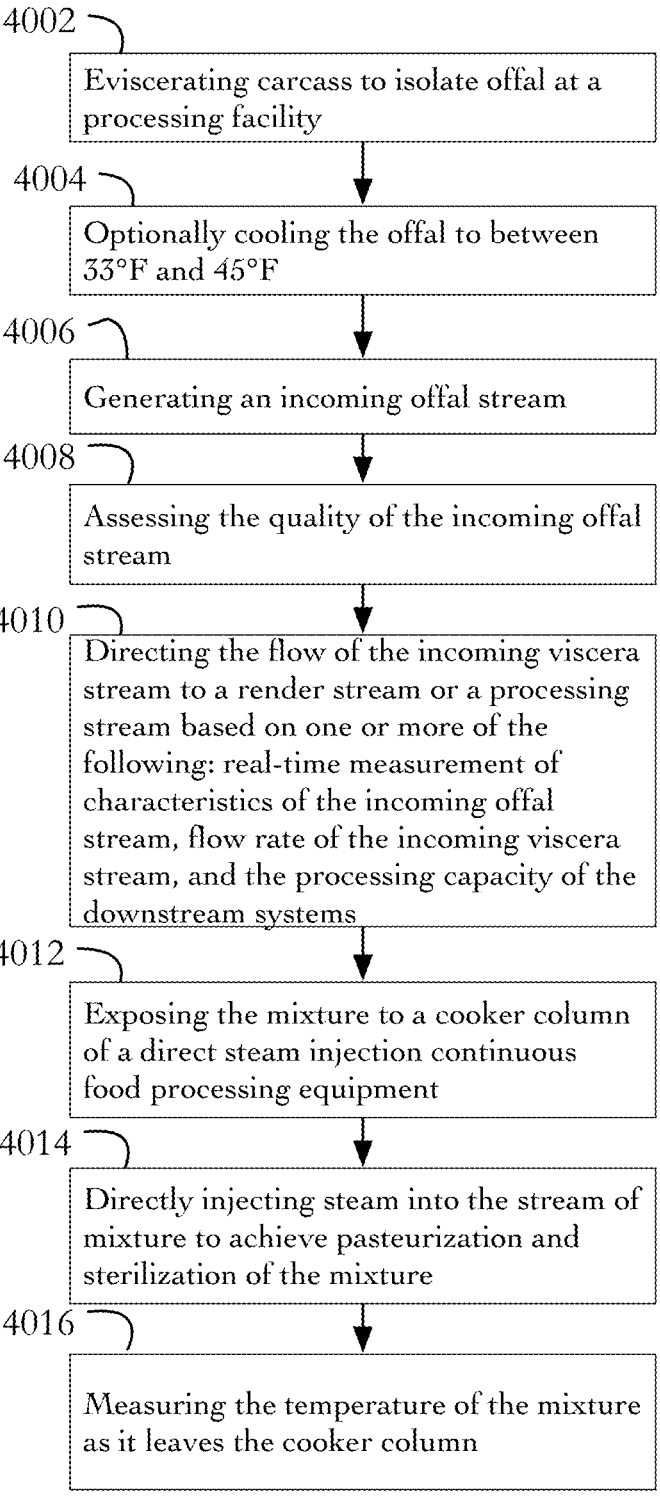

4002
Eviscerating carcass to isolate offal at a processing facility

4004
Optionally cooling the offal to between 33°F and 45°F

4006
Generating an incoming offal stream

4008
Assessing the quality of the incoming offal stream

4010
Directing the flow of the incoming viscera stream to a render stream or a processing stream based on one or more of the following: real-time measurement of characteristics of the incoming offal stream, flow rate of the incoming viscera stream, and the processing capacity of the downstream systems 4012
Exposing the mixture to a cooker column of a direct steam injection continuous food processing equipment 4014
Directly injecting steam into the stream of mixture to achieve pasteurization and sterilization of the mixture 4016
Measuring the temperature of the mixture as it leaves the cooker column

Fig. 5

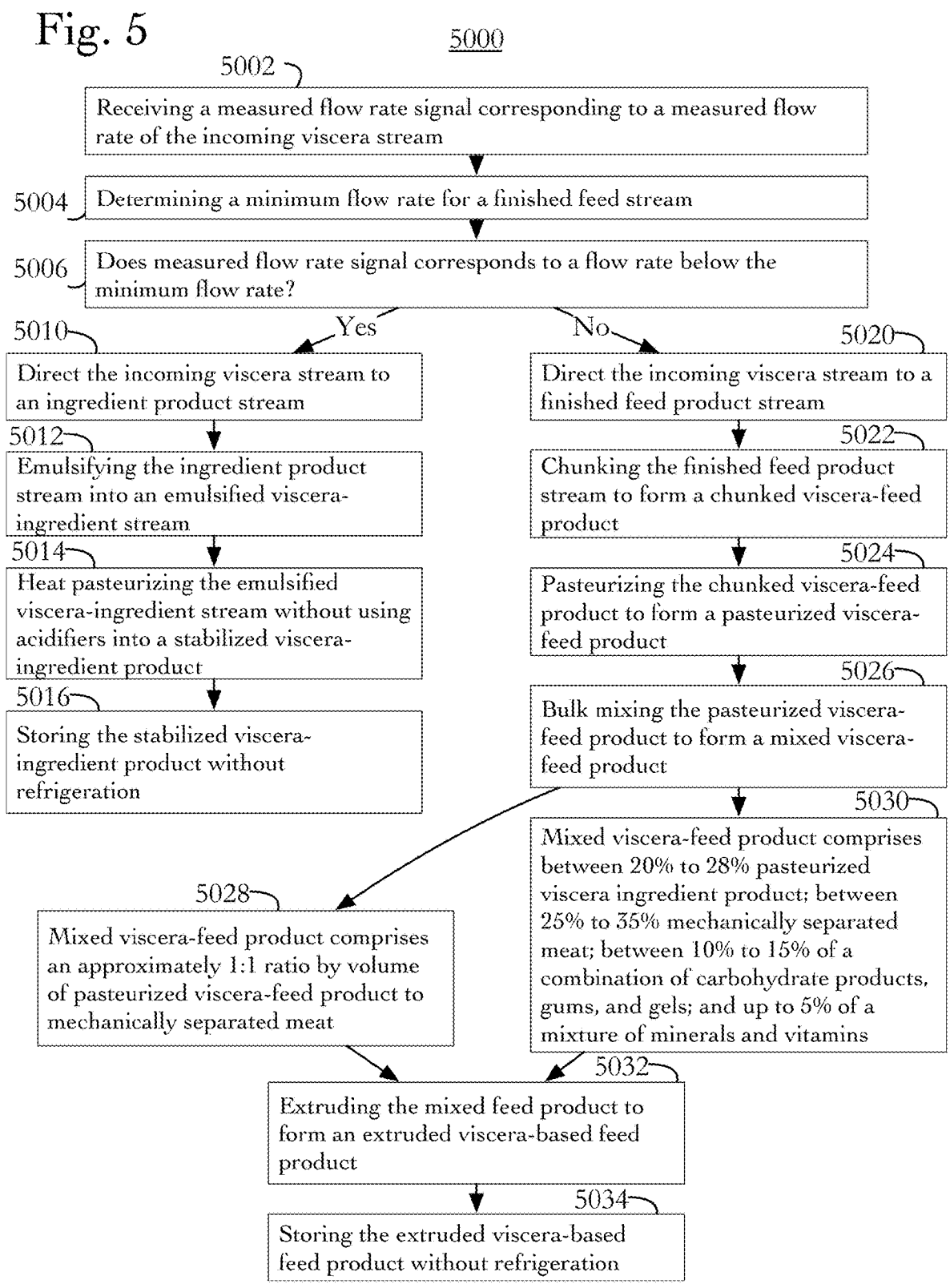

5000

5002

Receiving a measured flow rate signal corresponding to a measured flow rate of the incoming viscera stream 5004 — Determining a minimum flow rate for a finished feed stream 5006 — Does measured flow rate signal corresponds to a flow rate below the minimum flow rate?

5010 ——— Yes

Direct the incoming viscera stream to an ingredient product stream

5012 — Emulsifying the ingredient product stream into an emulsified viscera-ingredient stream 5014 — Heat pasteurizing the emulsified viscera-ingredient stream without using acidifiers into a stabilized viscera-ingredient product 5016 — Storing the stabilized viscera-ingredient product without refrigeration No ———— 5020

Direct the incoming viscera stream to a finished feed product stream

5022 — Chunking the finished feed product stream to form a chunked viscera-feed product 5024 — Pasteurizing the chunked viscera-feed product to form a pasteurized viscera-feed product 5026 — Bulk mixing the pasteurized viscera-feed product to form a mixed viscera-feed product 5030 — Mixed viscera-feed product comprises between 20% to 28% pasteurized viscera ingredient product; between 25% to 35% mechanically separated meat; between 10% to 15% of a combination of carbohydrate products, gums, and gels; and up to 5% of a mixture of minerals and vitamins 5028 — Mixed viscera-feed product comprises an approximately 1:1 ratio by volume of pasteurized viscera-feed product to mechanically separated meat 5032 — Extruding the mixed feed product to form an extruded viscera-based feed product 5034 — Storing the extruded viscera-based feed product without refrigeration

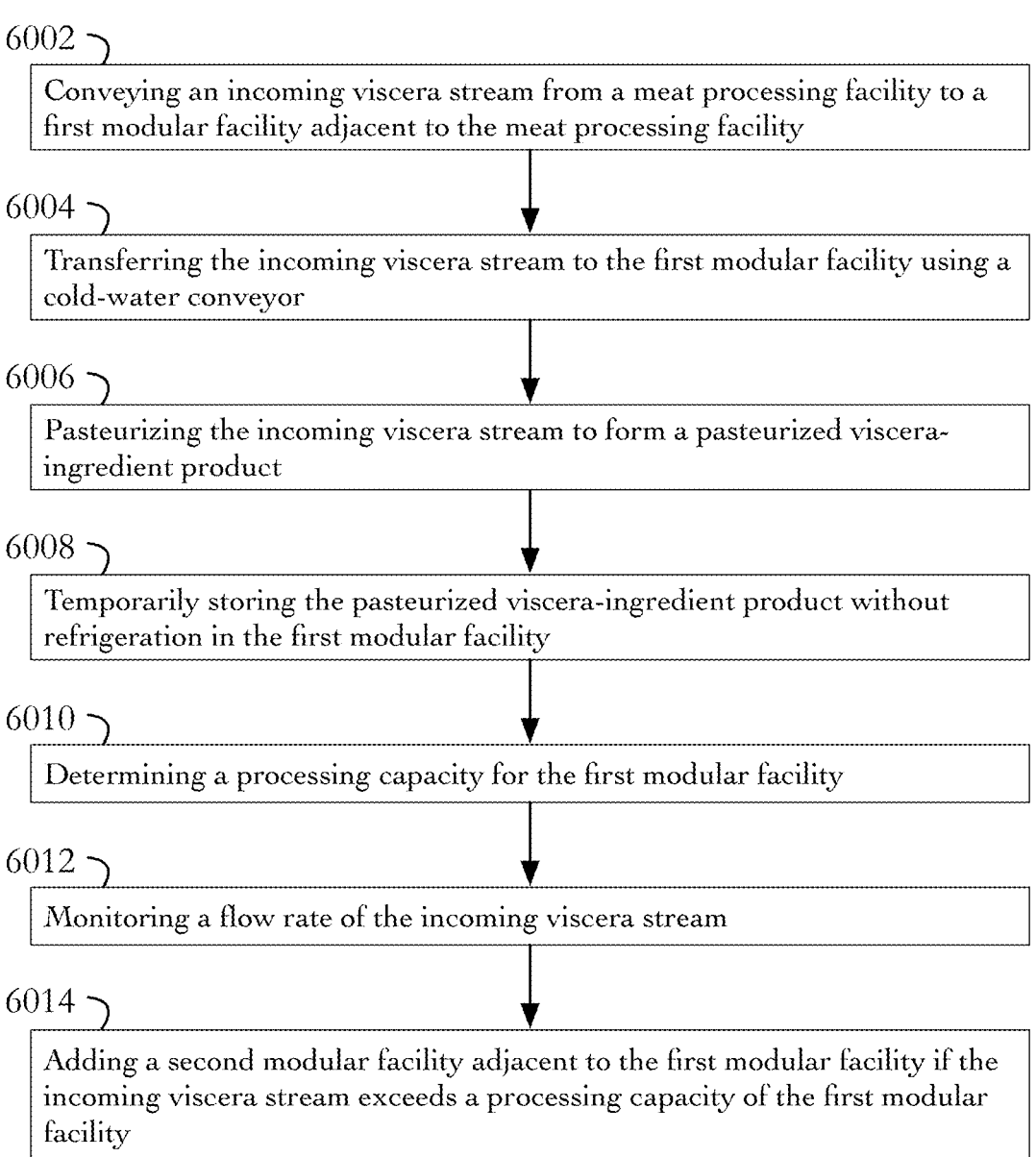

6002 ⌐

Conveying an incoming viscera stream from a meat processing facility to a first modular facility adjacent to the meat processing facility

6004 ⌐

Transferring the incoming viscera stream to the first modular facility using a cold-water conveyor

6006 ⌐

Pasteurizing the incoming viscera stream to form a pasteurized viscera-ingredient product

6008 ⌐

Temporarily storing the pasteurized viscera-ingredient product without refrigeration in the first modular facility

6010 ⌐

Determining a processing capacity for the first modular facility

6012 ⌐

Monitoring a flow rate of the incoming viscera stream

6014 ⌐

Adding a second modular facility adjacent to the first modular facility if the incoming viscera stream exceeds a processing capacity of the first modular facility

AUTOMATED METHOD FOR PROCESSING A VISCERA STREAM WITH A COOLING FLUID

CROSS-REFERENCE

This application is a divisional of U.S. application Ser. No. 16/562,428, entitled "Production of Finish Feed Product and Feed Ingredient from Viscera", and filed on 5 Sep. 2019, which claims benefit of U.S. Provisional Application No. 62/728,148, entitled "Production of Finish Feed Product and Feed Ingredient from Viscera", and filed on 7 Sep. 2018.

FIELD OF INVENTION

This disclosure relates to conveying a viscera stream from an eviscerating site to a processing site using a cooling fluid for conveyance and post cooking processing.

Viscera is a valuable protein source that is currently poorly utilized in industrial food processing facilities. Viscera includes the internal organs in the main cavities of the body, such as the intestines, liver, heart, and stomach. While poorly utilized in industrial food processing facilities, viscera is commonly the first portion of a carcass that is eaten when wolfs and other wild animals first approach the carcass. Eventually they come back to the carcass and consume up to 95% of the body, but the first portion consumed is generally the viscera.

In processing poultry in particular, the viscera is generally treated as minimal value product. The typical process for preparing a carcass at a chicken carcass processing facility involves:

a. Receiving the poultry and transferring the birds onto a supply conveyor or overhead conveyor.
b. The poultry is then slaughtered.
c. After scalding, the poultry is defeathered.
d. At an evisceration station, the viscera of the poultry is removed. The viscera is conveyed to a byproduct recovery station. Commonly the viscera is then prepared for rendering.

Rendering is a heating process for extracting some value from the viscera. Rendering is the process of removing certain fats from water and protein residues. These are used to produce edible lards and dried protein residues.

The waste from slaughtering poultry includes blood, feathers, and offal. Offal includes viscera, heads, and feet. Poultry viscera generally includes intestines and organs from the thoracic and abdominal regions, and trimmed tissues such as gizzard linings.

The quality of viscera rapidly diminishes, at least in part due to the digestive enzymes present. Therefore, the potential for viscera to be used as a feed ingredient decreases rapidly without proper preservation.

SUMMARY OF THE INVENTION

We recognized that viscera could be processed to form a finish feed product or an ingredient for an extruded feed product. This would dramatically increase the value of the offal for the processing facility and provide a fresh, nutritious, and environmentally friendly ingredient for animal feeds. The ground viscera is then processed into the finished feed product or ingredient for a final feed product, such as an extruded feed product.

Potential advantages of the current disclosure include:

a. no or little refrigeration needed for the bulk product, which reduces energy consumption and reduces capital expenditures;
b. receiving facility is not required to make capital investment in frozen block breaking equipment;
c. receiving facility does not need a separate meat receiving room;
d. reduces risk of introducing *salmonella* into receiving facility;
e. no expensive clean-up is required at the receiving facility;
f. the bulk product does not have offensive odors, as typical meat rooms may develop from unprocessed meat products; and
g. viscera processed into a finished feed product or ingredient for an extruded feed product has higher resale margins than typical rendered viscera products.

We recognized that an independently controlled variable flow of an incoming viscera stream can be utilized to maximize the creation of value-added products created from the variable flow. In order to maximize the creation of value-added products, a measured flow rate signal is received that corresponds to a measured flow rate of the incoming viscera stream. The measured flow rate can be generated on site using industry standard equipment or upstream at the processing facility. The viscera processor must determine a minimum flow rate for the greater value-added product based on the specifications of the equipment. For example, a finished feed has a high value-add than an ingredient product. The processor therefore determines the minimum flow rate suitable for the finished feed processing equipment, which becomes the minimum flow rate. The processor or the system monitors the flow rate and directs the incoming viscera stream to an ingredient product stream if the measured flow rate signal corresponds to a flow rate below the minimum flow rate. The processor or the system directs the incoming viscera stream to a finished feed product stream if the measured flow rate at least equal to the minimum flow rate.

In an independently controlled variable flow of an incoming viscera stream, the viscera processor may have little to no control over the flow rate. For example, an autonomous company may decide the carcass processing rates for the day or a market fluctuation could change the processing rates. The viscera processor can be ready to maximize the creation of value-added products by creating a tiered system, where low flow rates result in the creation of a viscera-based ingredient process that is shelf stable. Alternatively, at very low flow rates the incoming viscera stream can be directed to a rendering process, which is a lower value-added product than the ingredient stream. If the carcass facility operator increases production of the viscera, then the viscera processor can create a final feed product using the higher flow rates.

In order to process the ingredient stream, the incoming viscera stream is emulsified and then heat pasteurized without using acidifiers. The product is a shelf stable viscera-based ingredient product that can be stored on site without refrigeration. Refrigeration is costly to maintain. Shelf stable products can be stored and transported at a much lower cost. Shelf stable is also advantageous because the receiving facility does not have to break a frozen block of the viscera-based ingredient product. The consumer market may also prefer that no preservatives be added. A pasteurized, shelf-stable product may not require the use of preservatives.

When there is sufficient flow rate of the incoming viscera stream to divert the stream to a finished feed product stream, the finished feed product stream is chunked to form a chunked viscera-feed product. The chunked product is pasteurized and then mixed with other ingredients according to a species-specific recipe. The recipe may comprise an approximately 1:1 ratio by volume of pasteurized viscera-feed product to mechanically separated meat. The recipe can also comprise between 20% to 28% pasteurized viscera ingredient product; between 25% to 35% mechanically separated meat; between 10% to 15% of a combination of carbohydrate products, gums, and gels; and up to 5% of a mixture of minerals and vitamins. The mixed product may be extruded a shelf stable extruded viscera-based feed product that can be stored on site and transported without refrigeration.

Processing of these value-added products can be performed at a modular facility adjacent to a meat processing facility. This allows quick and easy transport of the viscera to the processing facility. The incoming viscera stream can be conveyed from the meat processing facility to a first modular facility adjacent to the meat processing facility. Specifically, the incoming viscera stream can be transferred to the first modular facility using a cold-water conveyor, which has the advantage of slowing down the auto-degradation of the viscera. The incoming viscera stream is pasteurized as described above and can be temporarily stored on site and transported without refrigeration. The operator may also determine a maximum processing capacity for the first modular facility. By monitoring the flow rate of the incoming viscera stream, the operator can compare the flow rate of the incoming viscera stream with the processing capacity of the first modular facility. If the incoming viscera stream exceeds the processing capacity of the first modular facility, the operator can install a second (or third, fourth, etc.) modular facility adjacent to the first modular facility to increase the capture rate of the available viscera stream and to maximize the creation of value added viscera-based products.

BRIEF DESCRIPTION OF DRAWINGS

These and other features, aspects, and advantages of the present disclosure will become better understood with regard to the following description, appended claims, and accompanying drawings.

FIG. 1 shows a schematic diagram of a viscera-processing facility.

FIG. 2 shows a flow chart showing the steps of a method of processing a stream of offal or viscera for use as an ingredient in a pet food.

FIG. 3 shows a flow chart showing the steps of a method of processing a stream of offal or viscera for use as a finished feed product.

FIG. 4 shows a flow chart showing the steps of a method of processing offal or viscera based on a measured quality of the offal or viscera.

FIG. 5 shows a flow chart showing the steps of a method of processing viscera to form a viscera-ingredient product and an extruded viscera-based feed product, neither of which require refrigeration.

FIG. 6 shows a flow chart showing the steps of a method of maximizing the creation of value-added products from an independently controlled variable flow of an incoming viscera stream.

DETAILED DESCRIPTION

Figure 1:
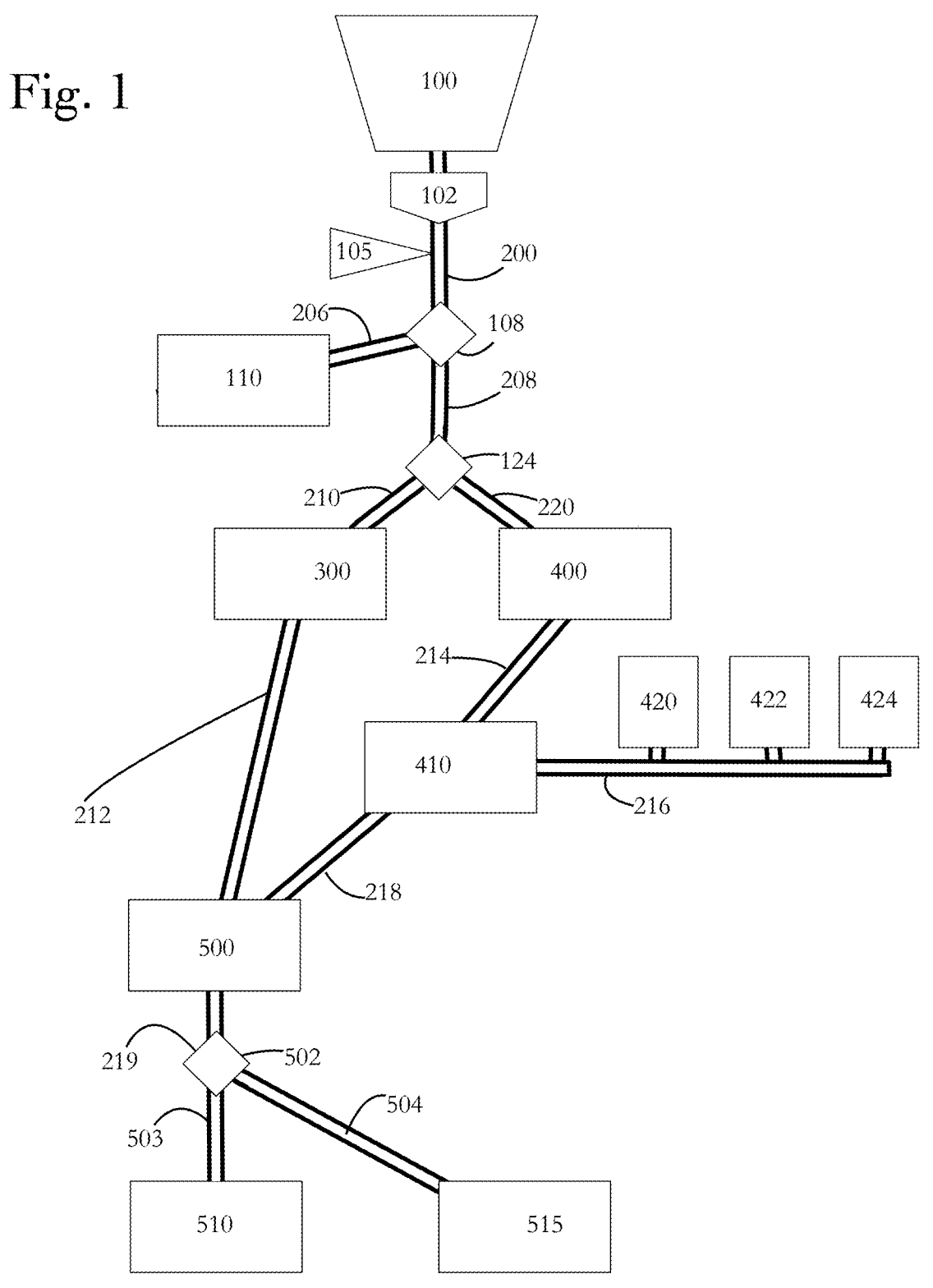

At the carcass processing facility, the viscera is rapidly utilized in order to prevent the rapid degradation of the product. Fresh, raw viscera is generated at the slaughter facility at the evisceration step. The viscera may be stored in a first interim tank 100. The first interim tank 100 may have a mixer to maintain the flowability of the viscera. The viscera may be pumped or conveyed—such as with a water plume—to generate an incoming viscera stream 200. A pump 102 is shown in FIG. 1 to generate the incoming viscera stream 200. If the viscera is conveyed by water plume, the viscera may be filtered to remove the viscera from the water at the viscera processing facility.

The initial processing stream may involve a quality assurance station 105. The quality assurance station 105 may process the incoming viscera, where certain qualified portions of the stream are directed for further processing and non-qualified portion of the stream is diverted for rendering. Diverting can also be used if the incoming stream of viscera exceeds the processing capacity for the ingredient or feed product streams.

A diverter valve 108 is disposed in the product flow stream. A portion of viscera flow stream may be diverted to a render stream 206. A portion of the viscera flow stream may be diverted to a processing stream 208. With the incoming viscera stream 200 exceeding the minimum flow rate required for the processing stream 208, diverting a portion of the stream to the render stream 206 allows excess viscera to be utilized for rendering at a rendering equipment 110, while providing a continuous and steady stream of viscera to the processing stream 208. The viscera made be qualified using any number of criteria and processing. For example, feet, feathers, or bones may be removed from the processing stream and directed to the rendering stream. The quality assurance station 105 may comprise mechanical separation equipment to remove protein from bone such that the undesirable portions are discharged into the rendering stream 206.

The processing stream can be utilized to make a viscera feed ingredient or a finished feed product. A second divert valve 124 controls the output flow of the processing stream 208 between an ingredient stream 210 and a final feed product stream 220.

The ingredient stream 210 generates a product that is appropriate for use in a final feed product, such as an extruded product, and may be further processed at another site. The ingredient stream 210 results in a shelf stable product. The ingredient stream 210 flows to an emulsifier 300. The emulsifier is configured to emulsify the viscera in the ingredient stream 210 according to a predetermined parameter, which may include one or more of protein content, fat content, and grind size. The emulsified product flows through an emulsified stream 212. The emulsified stream 212 is then pasteurized and sterilized at the cooking device 500. The cooking device 500 may comprise a Gold Peg® RotaTherm® Continuous Food Processing Machine. The cooking device 500 may utilize steam to pasteurize and sterilize the emulsified viscera at temperatures from 63° C. to 100° C., or from temperatures from 100° C. to 145° C. Cooking the viscera at these temperatures causes the proteolytic enzymes to be denatured, preventing the rapid degradation of the viscera. The cooking device 500 may be configured to generate aseptic conditions or sterilization/ultra-high temperature pasteurization (UHT) conditions.

The ingredient product is then discharged into a container 510. The container 510 may comprise a 5-gallon bucket, a 55-gallon drum, a 275-gallon totes, or a 330-gallon totes, a tanker truck, or a sterile combo (tote plus bladder bag). The container 510 may be sterilized, such as by applying quaternary ammonium or another surface sterilant.

The ingredient product of this disclosure is advantageous over existing meat ingredients because the viscera is shelf stable without the use of acidifiers. The receiving facility does not need to have a dedicated meat room, as the meat ingredient product comes pathogen free. Being shelf stable, no refrigeration is required.

As noted above, the processing stream can be utilized to make a viscera feed ingredient or a finished feed product. The second divert valve 124 controls the output flow of the processing stream 208 between the ingredient stream 210 and the final feed product stream 220.

The final feed product stream 220 is directed to a meat-cutting machine 400. The meat cutting machine chunks the viscera into chunks between 3 mm to 10 mm. Meat chunked to a size of 3 mm to 10 mm maintains its appearance as meat, rather than appearing like a processed product. The chunked meat is then directed through path 214 to a mixer 410. The mixer 410 may be a tumbler mixer to efficiently and completely mix the chunked meat from path 214 with one or more ingredients according to a formula. Ingredients are added to the chunked viscera to form a complete diet. Additional meat, such as a mechanically separated meat product may be added. Additionally, carbohydrate products, gums, gels, minerals, vitamins, fruits, vegetables, and water may be added. In the illustrated schematic, three ingredient tanks 420, 422, 424 are shown with an appropriate conveyance line 216. Once the chunked viscera and the other ingredients are sufficiently mixed, then the mixed product is conveyed through conveyance line 218 to the cooking device 500. The cooked, mixed product is conveyed through conveyance line 219 to a three-way valve 502. The final feed product can be packaged in retail packaging on site when the three-way valve 502 is selected to convey the cooked, mixed product through conveyance line 504 to a retail packaging device 515. Alternatively, the final feed product can be loaded into the container 510 when the three-way valve 502 is selected to convey the cooked, mixed product through conveyance line 503 for subsequent retail packaging, such as in an offsite facility.

One advantage of the current disclosure is the rapid, on-site processing of the viscera stops the inherent auto-degradation of the viscera. By cooking the viscera at the same site as the evisceration process—or adjacent to the facility, in the case of a modular facility—the fresh viscera can be converted into an animal feed product that has higher value than is currently realized. The pasteurization and sterilization results in a shelf stable product, whether the product is an ingredient for further processing or a final pet food product.

In one embodiment, the formula for an extruded feed product may comprises the following: 25% Viscera processed according to the current disclosure; 25% to 35% Mechanically Separated Meat (MSM); 10% to 15% Carbohydrate Products, Gums, Gels, such as Wheat, soy, corn, tapioca, etc., or a combination thereof; 5% Minerals/Vitamins; Fruits and Vegetables, such as Apples, banana, sweet potato, cranberry, carrots, peas, etc., or a combination thereof; and Water. The formula may also comprise flavor enhancers in the range of 5-20%, such as sugar, salt, garlic, onion, and digests. The formula may also comprise preservatives in the range of 0.01% to 5.0%, such as Potassium sorbate, sorbic acid, butylated hydroxy anisole (BHA), butylated hydroxytoluene (BHT), mixed tocopherols, calcium propionate, zinc propionate, rosemary extract, citric acid, and sodium erythorbate. In one embodiment, no preservatives are added to the extruded feed product.

The problem of maintaining the offal or viscera fresh is solved by one or more of the following:

a. Chilling the water used in the water plume to transfer the offal or viscera. Water chilled to between 33° F. and 45° F. will decrease the protease activity and limit product degradation;

b. Reducing the acidity of the offal or viscera by exposing the offal or viscera to an alkalizing agent; and c. Rapidly heating the offal or viscera to denature and deactivate the self-destructive enzymes found in the offal and viscera.

The problem of preparing an offal-derived ingredient source from offal for an extruded feed product is solved by first eviscerating a carcass to isolate offal at a processing facility, according to step 2002. Optionally, the offal is cooled to between 33° F. and 45° F., according to step 2004. Optionally, the acidity of the offal or viscera by exposing the offal or viscera to an alkalizing agent, according to step 2006. Cooling of the offal can be done by showering or immersing the offal in a cooling fluid, such as cold water or cold air. The cooling fluid can be acidic or basic to adjust the pH of the offal. The cooling fluid may also contain salt concentrations to osmotically effect the offal. A cooling fluid having salt concentration greater than the offal or less than the offal. The cooling fluid may also be used to convey the offal from the eviscerating site to a processing site.

A method 2000 for processing a stream of offal or viscera for use as an ingredient in a pet food is shown in FIG. 2. The isolated offal is ground to semi-emulsified state, according to step 2008. Step 2010 is transferring ground offal by conveyor or auger from the processing facility to an independent modular facility. Step 2012 is feeding the ground offal with a feed pump having one or more rotating augers to provide a forward flow through the system. Step 2014 is exposing the ground offal to a cooker column of a direct steam injection continuous food processing equipment, such as a Gold Peg RotaTherm®. Step 2016 is directly injecting steam into the stream of ground offal to achieve pasteurization, sterilization or ultra-high temperature. Such as injecting steam at approximately 60 psi for pasteurization and sterilization within 15-20 seconds retention time within the cooker column. Step 2018 is measuring the temperature of the ground offal as it leaves the cooker column. Step 2020 is cooling the cooked ground offal. In one embodiment, the cooling unit incorporates a direct vacuum cooler. Alternatively, the cooling unit incorporates an indirect cooling using a heat exchanger. Step 2022 is dispensing the material from the system. Step 2024 is collecting the bulk product in portable totes. Such as 55-gallon drums, 275-gallon totes, or 330-gallon totes. The totes may be able to be lifted by individual workers or may require a forklift or similar mechanical assistance. Step 2026 is sealing the offal-derived ingredient source within the tote. Step 2028 is storing the offal-derived ingredient source without refrigeration. Step 2030 is transferring the sealed tote to a pet food facility without requiring refrigeration. Step 2032 is extruding the offal-derived ingredient source according to a species-specific recipe. The recipe may comprise:

i. 25% offal-derived ingredient source;

ii. 25% to 35% Mechanically Separated Meat (MSM);

iii. 10% to 15% Carbohydrate Products, Gums, Gels;

iv. 5% Minerals/Vitamins;

v. Fruits and Vegetables;

vi. Water.

The problem of preparing a finish feed product from offal may be solved by:

a. Eviscerating carcass to isolate offal at a processing facility.

b. Optionally cooling the offal to between 33° F. and 45° F.

c. Grinding the offal into chunk format.

d. Transferring ground offal by conveyor or auger to an onsite or independent modular-attached offal processing station.

e. Conveying the ground offal with a feed pump having one or more rotating augers to provide a forward flow through the system.

f. Mixing the ground offal with other feed ingredients to form a total feed product according to a recipe. The recipe may comprise:
  i. 25% chunked offal;
  ii. 25% to 35% Mechanically Separated Meat (MSM);
  iii. 10% to 15% Carbohydrate Products, Gums, Gels;
  iv. 5% Minerals/Vitamins;
  v. Fruits and Vegetables;
  vi. Water.

g. Exposing the mixture to a cooker column of a direct steam injection continuous food processing equipment, such as a Gold Peg RotaTherm®.

h. Directly injecting steam into the mixture stream to achieve pasteurization, sterilization or ultra-high temperature. Such as injecting steam at approximately 60 psi for pasteurization and sterilization within 15-20 seconds retention time within the cooker column.

i. Measuring the temperature of the mixture as it leaves the cooker column.

j. Heating the mixture to a minimum temperature exceeding 212° F., such as 220° F. to 260° F. to create a final feed product.

k. Cooling the mixture. In one embodiment, the cooling unit incorporates a direct vacuum cooler. Alternatively, the cooling unit incorporates an indirect cooling using a heat exchanger. In another example, the wastewater from the plume conveyance of the offal is utilized to cool the finished feed product.

l. Dispensing the final feed product from the system.

m. Collecting the finished feed product in a container, such as a portable tote. Portable totes may be a 55-gallon drums, 275-gallon totes, or 330-gallon totes. The totes may be able to be lifted by individual workers or may require a forklift or similar mechanical assistance.

n. Sealing the finished feed product within the container.

o. Storing the finished feed product without requiring refrigeration.

p. Transferring the sealed tote to a retail packaging facility without requiring refrigeration.

q. Packaging the finished feed product for retail without introducing pathogenic contaminants.

In embodiments where the offal or viscera is processed in a modular facility, the equipment can be installed within a shipping container or other steel framed modules. The module is outfitted with electrical power connections, conduits, piping, duct work, transitions, and equipment. The modules can be stacked, allowing material to flow under the flow of gravity from one piece of equipment in an upper module to a second piece of equipment in a lower module. As a modular facility, additional offal or viscera processing capacity can be added or removed as the market for viscera-derived pet food expands or contracts. For example, when the traditional market for rendered poultry offal has lower price, additional modular units can be attached to a poultry carcass processing facility. If the relative value of pork, fish, beef, or other rendered offal decreases below the poultry rendered product, the modular units can be transported to the respective carcass processing facility to take advantage of the market value. Individual modules can be loaded on a truck bed, train, or cargo ship. Modules may be connected to facility utilities such as electrical, boiler room, air compressors, water, and water treatment systems. The operator of a modular value-added viscera processing facility may be independent of the operator of the carcass processing facility. In such circumstances, the operator of the modular facility may not have control over the production rate of the incoming viscera stream.

In one embodiment, the viscera is rapidly cooled. By rapidly cooling the viscera, the viscera maintains its freshness. The viscera is ground to either a chunk format or a semi-emulsified state in order to facilitate transfer of the viscera from the carcass processing facility to the modular facility or separate viscera processing room.

A trial run was made according to the processes described above to produce approximately 2,000 lbs. of the final feed product. Ingredients were added according to the following recipe:

| Ingredient Name | Amount added in pounds (lbs.) |
| --- | --- |
| chicken viscera | 738.54 |
| Chicken, MD, frozen | 738.24 |
| Rice, Brown | 622.35 |
| Chicken Meal | 328.6 |
| Beet Pulp | 147.71 |
| Optisol 9000 - glanbia | 147.71 |
| Potassium Chloride | 131.04 |
| Digest - Liquid Dog | 59.08 |
| Egg Product, Dried | 14.77 |
| Dicalcium Phosphate | 6.907 |
| Inulin | 5.908 |
| Vit PMX Kansas Dog Cat Non-Chi | 4.431 |
| Fish Oil | 2.954 |
| Choline Chloride, 60% dry | 2.954 |
| KSDC TM InOrg pmx | 2.954 |
| Ingredient Total: | 2,954.15 |

The ingredients were manually fed into a tumbler mixer. The ingredients were mixed together until homogenously distributed. The mixed ingredients had a moisture content of 38.5%. The mixture was fed to a GoldPeg® Direct Steam Injection RotaTherm® Continuous Cooker at between 10 psi to 30 psi in feed. The cooking device was operated at 234° F. cook temperature with 60 psi of steam. The resultant product lost 954 lbs of moisture, for a total final feed ingredient production of 1,940 lbs. The final feed ingredient was stored in 5-gallon buckets at ambient temperatures, without refrigeration, acidification, or other preservatives. The final feed ingredient has been shelf stable at ambient temperature without developing off odors or any visible signs of degradation or pathogen growth for approximately 4 months. The final feed product was observed to be extremely palatable when fed to dogs. The above process produces a pet food having 10% moisture, 26% crude protein. The product could be packaged for retail sales in pouches for individual servings. The nutritional content of the final feed product was analyzed on the date of production and yielded the following nutritional content:

| Nutrient Name | Value | Units |
| --- | --- | --- |
| MOISTURE | 10 | % |

-continued

| Nutrient Name | Value | Units |
|---|---|---|
| CRUDE PROTEIN | 26 | % |
| ASH | 11.439 | % |
| Calcium | 1.281 | % |
| Phosphorous | 0.88 | % |
| Potassium | 3.863 | % |
| Zinc, total | 177.249 | mg/kg |
| Vitamin A, total | 26300.793 | IU/kg |
| Vitamin E, total | 163.348 | IU/kg |
| Choline, total | 2696.614 | mg/kg |
| Taurine, total | 0.093 | % |
| CRUDE FIBER | 3.189 | % |
| Carbohydrate | 31.741 | % |
| ME | 3519.566 | kcal/kg |
| CRUDE FAT | 17.631 | % |
| LA 18:2n6 | 2.59 | % |
| ARA 20:4n6 | 0.495 | % |
| Omega 3 FA | 1.272 | % |
| Omega 6 FA | 3.132 | % |
| Tocopherols | 91.612 | ppm |

Offal, a more general term that includes viscera, is also a valuable protein source that is poorly utilized in industrial food processing facilities. Offal includes the viscera as well as trimmings, entrails, marrow, tails, tongues, skin, and other parts of the carcass that are generally discarded or otherwise rendered. Any of the disclosures that reference viscera may also utilize offal in addition to viscera or instead of viscera.

An advantage to this process is being able to list meat as a primary—if not first—ingredient in a listing of ingredients. Whether utilized directly into a final pet food or as an ingredient in a subsequent processing step, viscera is an inexpensive meat source that provides substantial amounts of protein. That viscera is naturally a preferred portion of the meat by wild animals confirms its palatability and increases consumer credibility for viewing the meat source as natural. Additionally, using viscera as an animal feed increases the amount of the carcass that is productively used and reduces waste and byproducts. Creating a viscera-based ingredient or final feed is a way to increase the value of the carcass-processing byproduct.

We disclose a method for utilizing commercial waste parts of a carcass in the manufacture of shelf stable pet food products, the method comprising the steps of:

a. Receiving an incoming viscera stream from the commercial processing of animals;

b. Measuring the flow rate of the incoming viscera stream;

c. Directing a portion of the incoming viscera stream to produce a processing stream once the flow rate of the incoming viscera stream exceed the minimum required processing flow rate;

d. Selectively directing the incoming viscera stream between a final feed stream and an ingredient product stream;

e. Reducing the size of the viscera in the final feed stream;

f. Mixing the viscera with a grain and a vegetable to produce a mixture in the final feed stream;

g. Emulsifying the viscera in the ingredient product stream;

h. Receiving the final feed stream and the ingredient product stream through a Y-valve to produce a processing stream;

i. Heating the processing stream to a temperature of at least 220° F. to sterilize the mixture and produce a final product;

i. Cooling the final product;

j. Sealing the final product in a container; and k. Storing the container containing the final product without requiring refrigeration.

A method 3000 for processing a stream of offal or viscera for use as a finished feed product is shown in FIG. 3. The process is equally applicable when substituting viscera for offal. Step 3002 is eviscerating carcass to isolate offal at a processing facility. Step 3004 is optionally cooling the offal to between 33° F. and 45° F. Step 3006 is cutting the offal to a chunk format with between 3-10 mm size chunks. Step 3008 is transferring chunked offal to an onsite or modular-attached offal processing station. Step 3010 is conveying the chunked offal to provide a forward flow through the system. Step 3012 is mixing the ground offal with other feed ingredients to form a total feed product according to a recipe. Step 3014 is exposing the mixture to a cooker column of a direct steam injection continuous food processing equipment. Step 3016 is directly injecting steam into the stream of mixture to achieve pasteurization and sterilization of the mixture. Step 3018 is measuring the temperature of the mixture as it leaves the cooker column. Step 3020 is cooling the final feed product. Step 3022 is cooling the final feed product. Step 3024 is dispensing the final feed product from the system. Step 3026 is collecting the final feed product in a container. Step 3028 is sealing the final feed product within the container. Step 3030 is storing the final feed product without requiring refrigeration. Step 3032 is transferring the container to retail packaging facility without requiring refrigeration. Step 3034 is packaging the finished feed product for retail without introducing pathogenic contaminants.

A method 4000 for processing offal or viscera based on a measured quality of the offal or viscera is provided in FIG. 4. Step 4002 is eviscerating carcass to isolate offal at a processing facility. Step 4004 is optionally cooling the offal to between 33° F. and 45° F. Step 4006 is generating an incoming offal stream. Step 4008 is assessing the quality of the incoming offal stream. Step 4010 is directing the flow of the incoming viscera stream to a render stream or a processing stream based on one or more of the following: real-time measurement of characteristics of the incoming offal stream, flow rate of the incoming viscera stream, and the processing capacity of the downstream systems. Step 4012 is exposing the mixture to a cooker column of a direct steam injection continuous food processing equipment. Step 4014 is directly injecting steam into the stream of mixture to achieve pasteurization and sterilization of the mixture. Step 4016 is measuring the temperature of the mixture as it leaves the cooker column.

A method 5000 for processing viscera to form a viscera-ingredient product and an extruded viscera-based feed product, neither of which require refrigeration, is provided in FIG. 5. Step 5002 is receiving a measured flow rate signal corresponding to a measured flow rate of the incoming viscera stream. Step 5004 is determining a minimum flow rate for a finished feed stream. Step 5006 deciding whether measured flow rate signal corresponds to a flow rate below the minimum flow rate.

If, according to step 5006, the measured flow rate signal corresponds to a flow rate below the minimum flow rate, then the method proceeds to Step 5010. Step 5010 is directing the incoming viscera stream to an ingredient product stream. Step 5012 is emulsifying the ingredient product stream into an emulsified viscera-ingredient stream. Step 5014 is heat pasteurizing the emulsified viscera-ingredient stream without using acidifiers into a stabilized viscera-ingredient product. Step 5016 is storing the stabilized viscera-ingredient product without refrigeration.

If, according to step 5006, the measured flow rate signal does not correspond to a flow rate below the minimum flow rate, then the method proceeds to Step 5020. Step 5020 is directing the incoming viscera stream to a finished feed product stream. Step 5022 is chunking the finished feed product stream to form a chunked viscera-feed product. Step 5024 is pasteurizing the chunked viscera-feed product to form a pasteurized viscera-feed product. Step 5026 is bulk mixing the pasteurized viscera-feed product to form a mixed viscera-feed product comprising an approximately 1:1 ratio by volume of pasteurized viscera-feed product to mechanically separated meat. Step 5028 is bulk mixing viscera-feed product comprises an approximately 1:1 ratio by volume of pasteurized viscera-feed product to mechanically separated meat. Alternatively to Step 5028, Step 5030 is bulk mixing the pasteurized viscera-feed product to form a mixed feed product according to the following recipe: between 20% to 28% pasteurized viscera ingredient product; between 25% to 35% mechanically separated meat; between 10% to 15% of a combination of carbohydrate products, gums, and gels; and up to 5% of a mixture of minerals and vitamins. Step 5032 is extruding the mixed feed product to form an extruded viscera-based feed product. Step 5034 is storing the extruded viscera-based feed product without refrigeration.

A method 6000 for maximizing the creation of value-added products from an independently controlled variable flow of an incoming viscera stream is provided in FIG. 6. Step 6002 is conveying an incoming viscera stream from a meat processing facility to a first modular facility adjacent to the meat processing facility. Step 6004 is transferring the incoming viscera stream to the first modular facility using a cold-water conveyor. Step 6006 is pasteurizing the incoming viscera stream to form a pasteurized viscera ingredient product. Step 6008 is temporarily storing the pasteurized viscera-ingredient product without refrigeration in the first modular facility. Step 6010 is determining a processing capacity for the first modular facility. Step 6012 is monitoring a flow rate of the incoming viscera stream. Step 6014 is adding a second modular facility adjacent to the first modular facility if the incoming viscera stream exceeds a processing capacity of the first modular facility. The modularity of the processing facilities allows the value-added processor to maximize the amount of the incoming viscera stream that is able to be processed without over-investing in equipment that is underutilized.

Although the present invention has been described in considerable detail with reference to certain preferred versions thereof, other versions are possible. Therefore, the spirit and scope of the appended claims should not be limited to the description of the preferred version contained herein.

In the Summary of the disclosure above and in the Description of the disclosure, and the Claims below, and in the accompanying Drawings, reference is made to particular features (including method steps) of the present disclosure. It is to be understood that the present disclosure in this specification includes all possible combinations of such particular features. For example, where a particular feature is disclosed in the context of a particular aspect or embodiment of the present disclosure, or a particular claim, that feature can also be used, to the extent possible, in combination with and/or in the context of other particular aspects and embodiment of the present disclosure, and in the present disclosure generally.

It is understood that the other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed in the present disclosure. Accordingly, the drawings and detailed description are to be regarded as illustrative in nature and not as restrictive.

The term "comprises" and grammatical equivalents thereof are used herein to mean that other components, ingredients, steps, etc. are optionally present. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25% to 100% means a range whose lower limit is 25%, and whose upper limit is 100%.

We claim:

1. An automated method for processing a viscera stream comprising the following steps:

receiving a viscera stream conveyed with a cooling fluid;

filtering the viscera stream to remove the cooling fluid as a wastewater;

heating the viscera stream with a cooking device to produce a cooked product; and cooling the cooked product of the viscera stream using the wastewater.

2. The method of claim 1, further comprising the step of:

conveying the viscera stream with the cooling fluid at between 33° F. and 45° F.

3. The method of claim 1, further comprising the step of:

conveying the viscera stream with the cooling fluid comprising an alkalizing agent.

4. The method of claim 1, further comprising the step of:

conveying the viscera stream from an eviscerating site to a processing site with the cooling fluid.

5. The method of claim 4, further comprising the steps of:

generating a measured flow rate signal corresponding to a measured flow rate of the viscera stream;

determining if the measured flow rate is at least equal to a minimum required processing flow rate for a finished feed product stream;

directing the viscera stream conveyed with the cooling fluid to a divert valve to a raw viscera-ingredient stream if the measured flow rate is below the minimum required processing flow rate; and diverting the viscera stream conveyed with the cooling fluid to a finished feed processing equipment while the measured flow rate signal is at least equal to the minimum required processing flow rate.

6. The method of claim 1, further comprising the step of:
 cooling the viscera stream to between 33° F. and 45° F.
  with the cooling fluid.
7. An automated method for processing a viscera stream
comprising the following steps:
 conveying a viscera stream with a cooling fluid;
 directing the viscera stream through a first path of a divert
  valve if a measured flow rate of the viscera stream is
  below a minimum required processing flow rate for a
  finished feed product stream;
 heating the viscera stream from the first path with a
  cooking device to produce a cooked product; and
 cooling the cooked product of the viscera stream using a
  wastewater from the cooling fluid.
8. The method of claim 7, wherein the viscera stream is
conveyed through the first path to a first modular facility
adjacent to an eviscerating site.
9. The method of claim 8, further comprising the step of
diverting the viscera stream through the divert valve to a
second modular facility if a measured flow rate exceeds the
minimum required processing flow rate.
10. The method of claim 7, further comprising the step of
filtering the viscera at a processing site to remove the
cooling fluid as the wastewater.
11. The method of claim 7, further comprising the step of
conveying the viscera stream with the cooling fluid at
between 33° F. and 45° F.
12. The method of claim 7, further comprising the step of
conveying the viscera stream with the cooling fluid com-
prising an alkalizing agent.
13. The method of claim 7, further comprising the step of
conveying the viscera from an eviscerating site to a pro-
cessing site with the cooling fluid.
14. The method of claim 7, further comprising the steps
of:
 receiving a flow rate signal corresponding to a measured
  flow rate of the viscera stream;
 conveying the viscera stream through the first path to an
  emulsifier;

diverting the viscera stream with the divert valve towards
  a finished feed processing equipment while the flow
  rate signal exceeds the minimum required processing
  flow rate;
 chunking the viscera stream to form a chunked viscera-
  feed product at the finished feed processing equipment;
  and
 heating the viscera stream and the chunked viscera-feed
  product with a cooking device operably connected to
  the emulsifier and further operably connected to the
  finished feed processing equipment.
15. An automated method for processing a viscera stream
comprising the following steps:
 conveying a viscera stream from an eviscerating site to a
  first modular facility adjacent to the eviscerating site
  using a cooling fluid;
 filtering the viscera stream to remove the cooling fluid as
  a wastewater;
 heating the viscera stream with a cooking device to
  produce a cooked product; and
 cooling the cooked product of the viscera stream using the
  wastewater.
16. The method of claim 15, further comprising the step
of storing the cooked product without refrigeration in the
first modular facility.
17. The method of claim 15, further comprising the step
of directing the viscera stream through a divert valve to the
first modular facility if a measured flow rate of the viscera
stream is below a minimum required processing flow rate for
a finished feed product stream.
18. The method of claim 17, further comprising the step
of diverting a portion of the viscera stream through the divert
valve to a second modular facility if the measured flow rate
exceeds the minimum required processing flow rate.
19. The method of claim 15, further comprising the step
of conveying the viscera stream with the cooling fluid at
between 33° F. and 45° F.
20. The method of claim 15, further comprising the step
of conveying the viscera stream with the cooling fluid
comprising an alkalizing agent.

* * * * *